April 12, 1927.

C. E. BOBBITT 1,624,131

BATTERY CASE

Filed Dec. 13, 1923  2 Sheets-Sheet 1

Inventor

Conrad Edison Bobbitt

By Frank Sassaman

Attorney

April 12, 1927.

C. E. BOBBITT 1,624,131

BATTERY CASE

Filed Dec. 13, 1923

Inventor
Conrad Edison Bobbitt
By Franks Addleman
Attorney

Patented Apr. 12, 1927.

1,624,131

UNITED STATES PATENT OFFICE.

CONRAD EDISON BOBBITT, OF HUMBOLDT, TENNESSEE, ASSIGNOR OF ONE-HALF TO LLOYD S. ADAMS AND JAMES D. SENTER, BOTH OF HUMBOLDT, TENNESSEE.

BATTERY CASE.

Application filed December 13, 1923. Serial No. 680,504.

This invention relates to battery boxes or cases intended primarily for use in connection with radio apparatus.

It is an object of this invention to produce a battery case adapted for use in holding a plurality of batteries or dry cells, associated with novel means by which the cells may be individually tested to determine their efficiency, and whereby any impaired or imperfect cells may be removed for the purpose of substituting cells of proper voltage.

It is a further object of this invention to produce a battery case having an insulated cover, with binding posts to which the terminals of the battery cells are connected, the said cover also having apertures alining with each battery cell.

It is a further object of this invention to produce a battery case in which groups of cells, or all of the cells, may be connected in series to supply full voltage when desired; and it is a further object of this invention to provide individual cell cases having novel means by which any one of the battery cells can be readily installed or removed.

With the foregoing and other objects in view, the invention consists in the details of construction and in the arrangement and combination of parts to be hereinafter more fully set forth and claimed.

My invention provides a case for battery cells which has a cover of insulating material associated therewith and provided with the usual terminals or binding posts for lead wires and for connecting wires, and in addition thereto plug-contacts which are connected by other conductors with the battery cells, there also being through the cover apertures for testing, by means of a volt meter, the strength of individual battery cells. The battery cells are individually connected to adjacent battery cells by conductors which, in accord with my invention, connect the metallic ends of a battery cell case with the opposite metallic end of the next battery cell case, the construction being such that any battery cell can be readily removed for replacement by simply removing a closure from the battery cell container case without in any way disturbing the electric connections.

I have illustrated my invention as embodying a B-battery for radio receivers.

In describing the invention in detail, reference will be had to the accompanying drawings forming part of this application wherein like characters denote corresponding parts in the several views, and in which—

Figure 1:
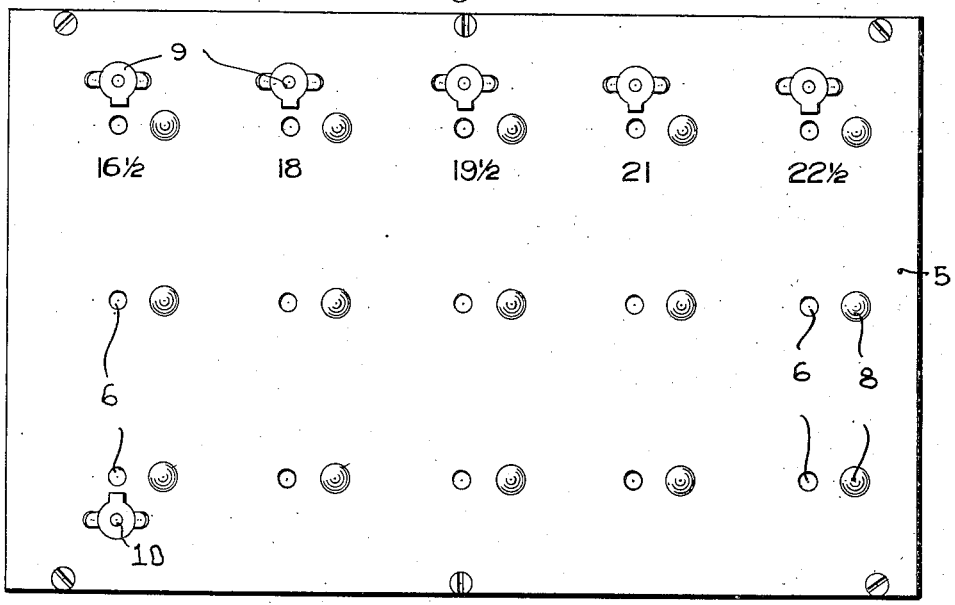
Figure 1 illustrates a plan view of the cover for the battery case.
Figure 2:
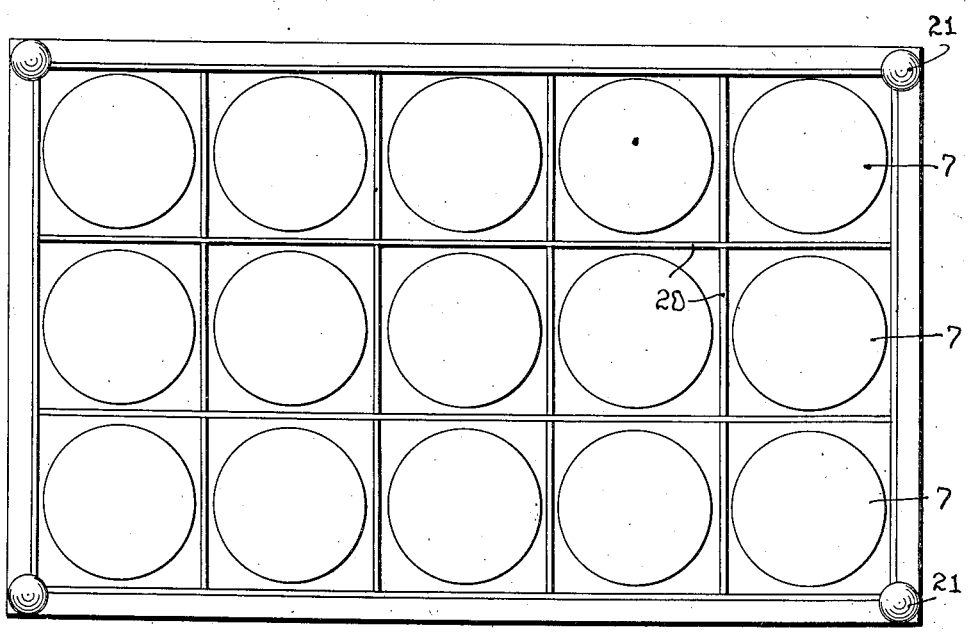
Figure 2 illustrates an underneath plan view of the battery case with the wiring omitted.

In the accompanying drawing, 5 refers to a top or cover plate of insulating material which in use is secured to a rectangular frame consisting of sides and end pieces which carry at their lower corners pads 21. The inner faces of the sides and ends are preferably provided with a lining of cardboard which is attached to the frame in any suitable manner and within such pieces of cardboard and attached thereto are longitudinal and transverse partitions 20 which interlock at their points of intersection and provide rectangular compartments which are of less height than the frame.

The rectangular compartments formed by the transverse partitions 20 have therein tubular battery cell cases or carriers 12, the body portions thereof being of cardboard or other appropriate insulating material and the body portions of the carriers 12 are placed in compartments formed by the partitions.

The tubular boxes or battery cell receivers each has at its upper end a metallic closure provided with a transverse portion 13 and the opposite ends of the tubular carriers 12 are each provided with an attached metallic rim having external male threads which are formed on their lower portions, said threads in use being engaged by a removable cap 16 having female threads on its upstanding rim for engagement with the male threads.

The battery cells or receivers 12 are of greater length than the battery cells 11, and above the cap 16 is placed a conical coil spring 15 which, when the parts are assembled, will engage with the lower portion of the battery cell and establish electric connection with the rim and press the carbon element of the battery cell against the under side of the metallic closure 13.

The transverse portion of the threaded closure 16 forms the bottom of the casing or frame and in use will be positioned in line with the outer edges of said frame and above the plane of the supporting pads 21. A short wire or connection 18 is secured to the rim of the closure 16' and extends therefrom to a member or bolt of the connecting member or terminal 9, a lead wire being attached thereto, as is usual in batteries of this character. A wire 19 is attached to a plug or contact 8 carried by and extending through the cover. This wire 19 extends from the plug to the rim attached to the casing which carries the closure 16.

The battery cells 11 are of the usual type used in the make-up of B-batteries for radio apparatus and for other purposes, and the batteries are connected by conductors 17 attached to the metallic tops 13 of the cell cases and are connected to the rim 16' of an adjacent cell case, these batteries being connected either in series or otherwise so that they may be used individually or collectively to give the desired voltage.

The insulating cover near one of its longitudinal edges is provided with binding posts 9, one for each transverse row of battery cells and to these posts is attached a lead wire, the wires 17 extending from one transverse row of batteries to the next row.

The cover 5 has above each one of the battery cells two apertures, one set of apertures being for the reception of plug-contacts 8 to the inner ends of which wires 19 are attached preferably by soldering, said wires also being soldered or otherwise attached to the lower rim 16' of a cell case. The other aperture 6 is for the passage of one terminal of a volt meter, which terminal in use is passed through an opening to contact with a cap of a cell case, the other terminal being placed in engagement with the plug 8, and by this means, the voltage of any particular battery cell may be determined.

To remove an individual battery cell from its tubular case, it is only necessary to unscrew the bottom cap and replace the removed battery cell with a new one. This can be accomplished without disconnecting any of the wires. The spring engages or contacts with the bottom of the battery cell and forces its carbon pole against the cap at the upper end of the cell closure and establishes contact therewith.

By the construction shown, I have provided a battery container of such construction that the battery cells may be placed therein and readily removed therefrom, the connecting wires having no positive engagement other than electrical with the batteries, and it will be noted that I also provide a means for testing each individual battery cell to determine its voltage. Also that the frame is of bottomless construction, such feature with the test openings or holes through the top providing for ventilation of the cells.

Figure 4:
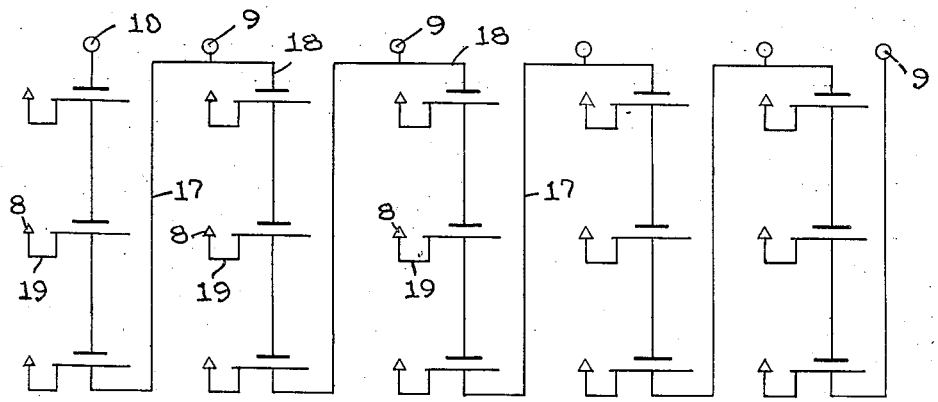
Figure 4 illustrates a diagrammatic view of the wiring system.

As will be noted from the foregoing description, each cell case or battery container has three wires connected to it, one of the wires connecting adjacent cell cases, one of the wires being connected with a binding post and a third wire which is connected for testing purposes only. In Fig. 4 I have shown diagrammatically the "hook-up", the numerals 8 indicating the terminals of the testing means.

Figure 3:
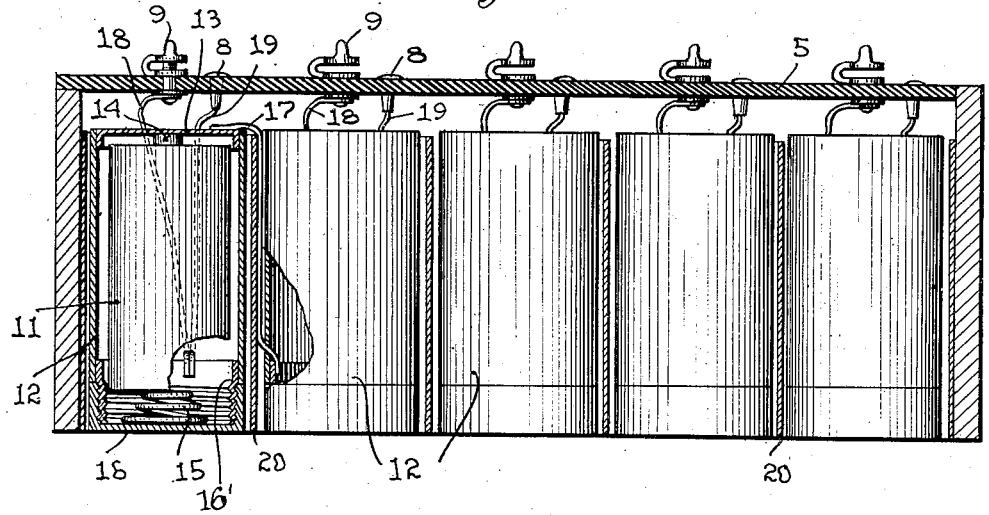
Figure 3 illustrates a sectional view of the battery case and cover.

By reference to Fig. 3 of the drawings, it will be noted that the wires or conductors 18 and 19 engage the contacts 8 and 9 which are attached to the cover 5, also that the conductor 17 which is attached to the metallic top of the battery cell containers extends therefrom over the upper end of the partition wall and then downward, being passed through the body portion of an adjacent container, the end thereof being secured to the ring of the battery cell container. The connections provide ample means for maintaining the battery cell containers in place. It will be noted that the partitions form rectangular chambers and that the battery cell containers are cylindrical; therefore, ample space will be provided beyond the battery cell containers for grasping and turning the screw-threaded caps to place the same and to remove them when desired.

I claim:

1. A container for batteries comprising a plurality of electrically connected battery receiving chambers, each of said chambers having metallic end closures which are fixedly attached thereto, rings fixedly attached to the opposite ends of the chambers, said rings extending beyond the ends of the aforesaid chambers, caps removably attached to the rings, and means for testing individual battery cells without the removal thereof from the chambers in which the batteries are placed.

2. A container for batteries provided with a cover of insulating material, a plurality of battery cell containers having an insulating intermediate portion and metallic ends, means for removing a metallic closure from the insulated portion of the battery container, electrical connections which extend from the lower portion of the battery cell container to metallic contacts which extend beyond the upper surface of the insulating cover, and an aperture located in line with the upper portion of the cell container for use with one of the contacts for testing purposes.

3. A container for battery cells having a series of battery cell containers with metallic ends, connections between the containers and other connections between the lower portion of the containers and with contacts carried by the cover, and means carried by the battery cell containing case for projecting and holding the battery cell in contact with the upper metallic portion of the battery cell containing case.

4. A container for battery cells having an open bottom, a top having binding posts, battery cell receiving chambers having body portions of non-conducting material and metallic closures for the ends of said chambers, rings attached to and extending beyond the ends of the chambers, the lower closure being removable from the rings, electric connections between a metallic ring carried by the lower portion of the chambers and extending therefrom to contact means on the cover, the parts being constructed so that the removable closures for the battery cell receivers will constitute the bottom of the exterior container.

5. A container for battery cells comprising a casing having a cover and a plurality of compartments within the casing, which compartments maintain battery cell cases having upper and lower metallic closures, means for electrically connecting the upper closures with the lower closures of an adjacent battery cell case, electric conducting means extending from the lower closure to the outside of the insulating cover of the container, and means for holding the battery cells in electrical engagement with the upper metallic closures of the battery cell cases.

6. A container for battery cells comprising a frame to which are attached a lining and transverse partitions, cylindrical battery cell cases maintained by the partitions and provided at one end with removable closures, said removable closures being in line with the lower edges of the side and end portions of the frame, a top of insulating material having apertures and contact points located above each battery cell when in place, one of said apertures and one of the contact points being utilized to determine the voltage of an individual cell.

7. A battery container comprising a casing having sides, partitions forming compartments for battery cell cases, a cover for the container having contacts and apertures located above the compartments, battery cell cases having metallic end portions, conductors which extend from the lower metallic end portions of the battery cell cases to the contacts, conductors attached to the upper metallic end portions of the battery cell cases, such conductors extending over the upper edges of the partitions and being connected to a metallic portion of an adjacent battery cell case.

8. A container for battery cells comprising a bottomless receptacle, longitudinal and transverse partitions for said container, battery cell containers provided with metallic end closures, a conductor attached to the upper closure of one of the battery cell containers and to a lower closure of an adjacent battery cell container, such conductor overlying the upper edge of a partition.

CONRAD EDISON BOBBITT.